March 11, 1969  R. W. STOFFEL ET AL  3,432,115

BELT SECURING MEANS

Filed July 21, 1967

INVENTOR
ROBERT W. STOFFEL
WENDELL STEVENSON
BY
*Hauke, Kraus & Gifford*
ATTORNEYS ated Mar. 11, 1969

3,432,115
BELT SECURING MEANS
Robert W. Stoffel, Ferndale, and Wendell Stevenson, New Baltimore, Mich., assignors to Jim Robbins Seat Belt Co., Royal Oak, Mich.
Filed July 21, 1967, Ser. No. 655,226
U.S. Cl. 242—107                       5 Claims
Int. Cl. B65h 75/48, 75/28

ABSTRACT OF THE DISCLOSURE

A snubber member having a generally C-shaped cross-section and mounted on the reel of a safety seat belt retractor provides means for anchoring the unstitched end of the safety belt to the reel. Finger sections provided on the snubber member engage sockets formed in the longitudinal surface of the reel.

BACKGROUND OF THE INVENTION

Field of the invention

This invention relates to means for securing the end of an elongated webbing to a shaft and more specifically to means for securing the end of a vehicle safety seat belt to a retractor reel supported for rotation between wind and unwind directions.

Description of the prior art

Occupant restraining systems for automotive vehicles typically employ an elongated restraining belt having an outer end adapted for coupling to a seated occupant for the application of restraining forces. The belt is normally connected to the vehicle by a retracting device having a rotatably mounted reel. Retractor reels are normally spring biased in the wind-up direction in order to wind the belt of non-locking retractors around the reel when it is not employed as a restraining element and in the case of emergency-locking retractors, to absorb belt slack. The terminal end of the belt is attached to the reel by a number of conventional means.

One such belt attaching means which has been successfully employed with non-locking retractors comprises forming a stitched loop around the belt so that when the belt is fully extended, a non-yielding connection is formed between the belt and the vehicle. A C-shaped clamping element which tightly embraces the loop and the reel provides a sufficient frictional engagement between the belt and the reel so that when the reel rotates in the wind direction, the belt is wound in a roll.

The aforementioned belt attaching means has proven inadequate for automatic-locking and emergency-locking retractors where the belt must be capable of applying restraint forces when only partially extended. The reason is that the wound portion of the belt, under the influence of a substantial tensile force, tends to unwind from the reel even though the reel is locked against rotation. Since the extended length of the belt is not anchored to the vehicle, it is incapable of restraining the occupant's movement relative to the vehicle.

Another conventional belt securing means comprises threading the terminal end of the belt through a longitudinal slot in the reel and then stitching the free end of the belt to form a permanent loop.

This latter method has a number of disadvantages which are typical of conventional belt securing means. The loop forming step requires a costly stitching operation. The looped end of the belt produces a lump in the wound-up belt that causes an uneven winding action unless compensated for by some form of spacer. In addition, the attachment of the looped belt to the reel is a difficult assembly operation.

The broad purpose of the present invention is to provide means for securing a saftey seat belt to a reel which provides a non-yielding connection between the vehicle and a partially extended belt, produces a substantially round belt roll on the reel, does not require a slotted reel and reduces the assembly effort required to join the belt to the retractor.

SUMMARY

The preferred embodiment of the present invention, which will be subsequently described in greater detail, forms a part of a seat belt retractor mounted alongside the seat assembly of a vehicle. The retractor includes a spring biased wind-up reel journaled for rotation in wind and unwind directions.

An elongated snubber member having a generally C-shaped cross-section and a thickness substantially corresponding to the thickness of the belt partially embraces the reel. The snubber includes a body section and first and second longitudinal side sections. A pair of finger sections inwardly bent from the longitudinal side edge of the first side section are seated in a pair of sockets formed in the peripheral surface of the reel. The fingers are spaced a longitudinal distance greater than the width of the belt so that the belt can be threaded between them. The body section of the snubber has an elongated slot extending parallel to the axis of the reel with a length accommodating the belt width.

The belt is attached to the reel by wrapping its terminal end under the second side section of the snubber and around the reel in a direction toward the slot. The belt is threaded around the reel below the fiirst side section, outwardly through the slot and then wrapped around the first side section in a reverse direction, back upon itself below the second side section and a second time out through the slot. When a tensile force is applied to the belt, the snubber and reel cooperate to clamp the belt to the reel support means.

A pair of outwardly bent tabs formed along the side edges of the snubber body section engage the reel mounting flanges of the support means and provide means for precisely spacing the mounting flanges which are normally drawn together when the reel is assembled.

The preferred belt securing means provides a non-yielding connection between the end of the belt and the reel. Thus, when the reel is locked against rotation, a partially wound belt cannot unroll around the reel. This is a requirement for a successfully operating automatic-locking retractor.

The C-shaped snubber produces a substantially round belt roll without the necessity for spacers. Furthermore the preferred snubber eliminates the conventional stitching operation which often requires up to three inches of additional belt, and assists in holding the reel in position during assembly.

It is therefore a primary object of the present invention to provide means for securing an elongated belt to a reel which provides a non-yielding connection between the reel and a partially extended portion of a belt wound on the reel when a tensile force is applied to the belt.

Another object of the present invention is to reduce the cost of securing an elongated belt to a rotatable reel by providing a belt securing means which does not require the webbing to be stitched to itself.

It is another object of the present invention to improve means for securing the end of a vehicle seat belt to a rotatable wind up reel by providing means for securing the belt to an unslotted reel.

Still another object of the present invention is to provide means for anchoring the end of a vehicle safety seat belt to a rotatable reel which winds the belt into a substantially round configuration without the necessity for spacer means to accommodate the lumps produced by conventional belt securing means.

Still another object of the present invention is to provide means for securing the end of a vehicle safety seat belt to a rotatable reel mounted to the vehicle which includes a snubber member partially embracing the reel and having a substantially C-shaped cross-section, a thickness substantially corresponding to the thickness of the belt, an elongated belt receiving slot formed in its midsection and a pair of finger members formed along one longitudinal edge which are engaged by a pair of sockets formed in the longitudinal surface of the reel with the belt being wrapped around the reel in a first direction, out through the slot and around one side edge of the snubber in a reverse direction, back under the opposite side section of the snubber and out again through the slot so that the belt is rigidly clamped to the reel.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
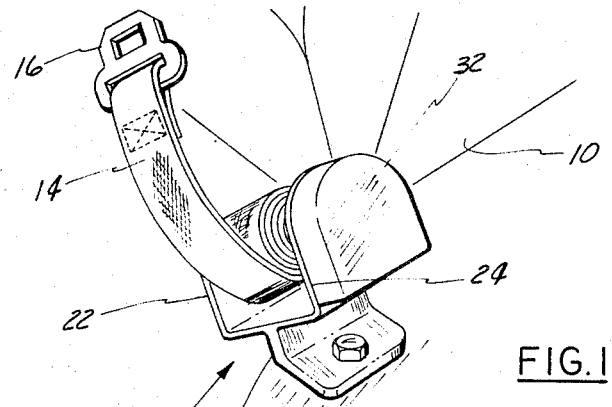
FIGURE 1 is a perspective view of a vehicle seat assembly and a safety seat belt retracting device mounted adjacent the seat assembly, the belt being secured to the retracting device by the present invention.
Figure 2:
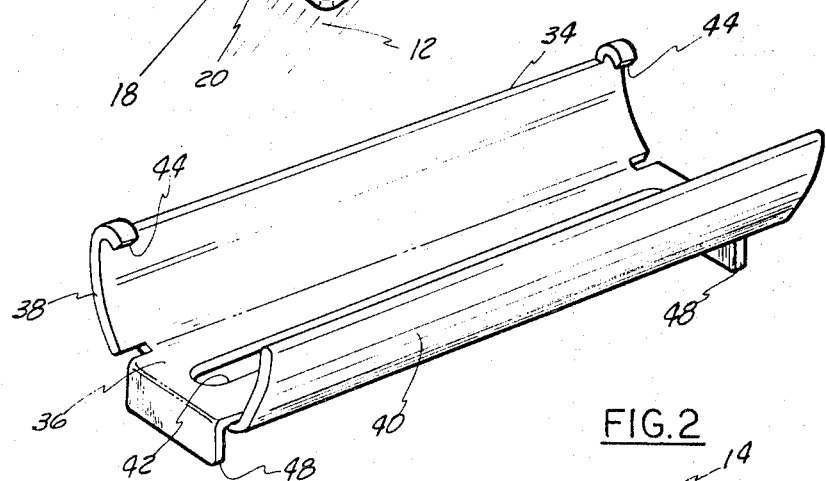
FIGURE 2 is a perspective view of the preferred belt snubber member.

Now referring to the drawings, FIGURE 1 illustrates a seat assembly 10 mounted to the floor 12 of a vehicle. A safety seat belt 14 carrying a coupling member 16 at its extended end is adapted to be connected across the lap of an occupant of the seat assembly 10 to a second belt section (not shown) having a complementary coupling section to provide a restraining system for the occupant of the seat 10. The belt 14 is anchored to the floor 12 of the vehicle by a retracting device generally indicated at 18. Retracting device 18 is illustrated as a non-locking retractor, but it is to be understood that the present invention is equally applicable as a means for securing a belt to automatic-locking retractors which employ self-adjusting hardware in the form of a self-locking mechanism which is capable when locked of withstanding restraint forces and in particular to emergency-locking retractors having adjustment hardware in the form of a locking mechanism that is activated by belt movement relative to the vehicle or other automatic action during an emergency.

Retracting device 18 anchors the belt 14 to the vehicle for the application of restraining forces on the occupant and winds the belt into a roll when the belt is not employed as a restraining element so that it is accessible to the user without interfering with his movements as he enters into or leaves from the vehicle.

The retractor device 18 includes a support member 20 having a pair of spaced flange sections 22 and 24 which are inclined in a direction parallel to the longitudinal movement of the belt 14. A reel 26 is mounted on the flanges 22 and 24 for rotation about an axis transverse to the longitudinal movement of the belt 14.

The reel 26 extends beyond the flange 24 and has an axial slot 28 formed in its extending end for engaging the inner end of a torsional spring member 30 The outer end of the torsional spring member 30 is connected to a casing 32 which is fixedly mounted to the flange section 24. The spring 30 is normally pretensioned so that the reel 26 is at all times biased in a wind direction so that the belt 14 automatically assumes its wound up condition when the user uncouples the belt from around his lap and releases it.

The end of the belt 14 is secured to the reel 26 by a snubber member 34. The snubber 34 has a generally C-shaped cross-section including a body section 36, a first side section 38 and a second, opposite side section 40. The snubber member 34 has a thickness generally corresponding to the thickness of the belt 14.

The body section 36 of the snubber member has an elongated belt-receiving slot 42 in its midsection which is parallel to the axis of the reel 26 and the side edges of side sections 38 and 40. The slot 42 has a width slightly greater than double the thickness of the belt 14 so that the belt can be threaded twice through the slot.

A pair of inwardly bent finger sections 44 depend from the longitudinal side edges the first side section 38 and are spaced a distance greater than the width of the belt 14. The finger sections 44 are received in a pair of radially inwardly formed sockets 46 (only one of which is shown) formed in the longitudinal surface of the reel 26.

A pair of outwardly bent tabs 48 depend from opposite sides of the body section 36 and are normally in sliding abutment with the inner surface of the flange sections 22 and 24. Normally the flange sections 22 and 24 are drawn together in the fabrication step, so that the tabs 48 provide means for precisely spacing them.

Figure 3:
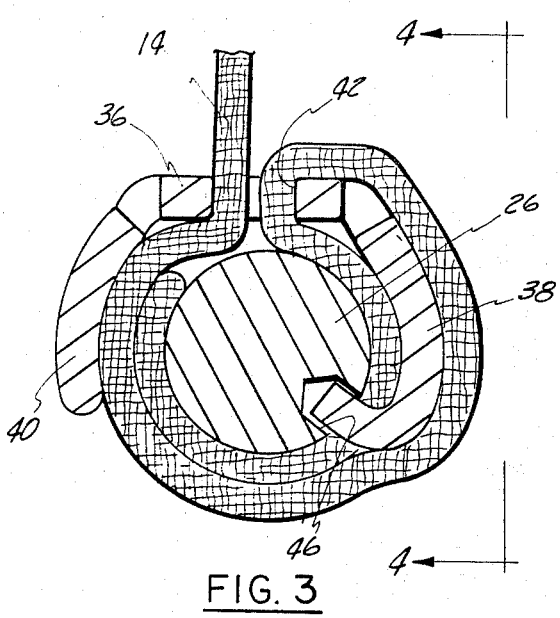
FIGURE 3 is a longitudinal sectional view showing the preferred snubber member of FIGURE 2 mounted on the wind-up reel with the end of the belt secured thereon.
Figure 4:
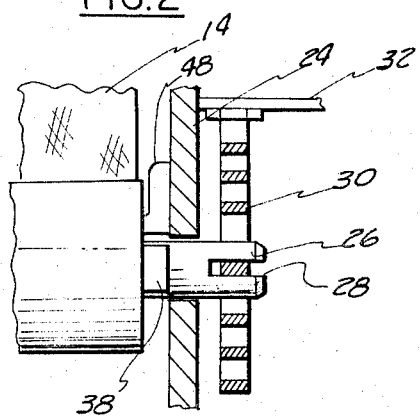
FIGURE 4 is a fragmentary view of the reel, belt and snubber as seen substantially along lines 4—4 of FIGURE 3.

As can best be seen in FIGURE 3, the belt 14 is secured to the reel 26 by wrapping the terminal end of the belt around the reel and under the first side section 40 of the snubber member and in a direction toward the side section 38, below the side section 38 and out through the slot 42, in a reverse direction around the side section 38 and back upon itself, then below the side section 40 and out through the slot. This arrangement tightly engages the belt 14 on the reel 26 without requiring a longitudinal slot in the reel and without any necessity for the stitching associated with a permanent loop which is necessary for conventional mounting arrangements. In addition, the overall configuration of the belt and the snubber member provides a substantially uniform winding diameter so that there is no objectionable lump in the wound section of the belt which conventionally requires some form of spacer.

Although we have described but one preferred embodiment of our invention, it is to be understood that various changes and revisions can be made therein without departing from the spirit of the invention as expressed in the scope of the appended claims.

We claim:
1. Means for connecting a safety seat belt to a vehicle comprising:
   (a) support means fixed to a vehicle,
   (b) a reel member journaled on said support means for rotation about an axis transverse to the longitudinal movement of the belt, said reel member having a pair of finger receiving sockets in its longitudinal surface, said sockets being spaced a greater distance than the width of the seat belt; and
   (c) a snubber member having a generally C-shaped cross-section including a body section and first and second side sections, said snubber member having an elongated belt-receiving slot in its body section with a length accommodating the width of the seat belt, and a pair of inwardly bent fingers along the longitudinal edge of said first side section, said snubber member partially embracing said reel with said fingers received in said sockets and with the end of the belt being wrapped in a first direction around said reel and under said first side section toward said slot, out through said slot and over said first side section in a reverse direction, under said second side section and upon itself and out through said slot so that said belt is tightly held in engagement by said reel and said snubber member.

2. The invention as defined in claim 1, wherein said support means includes a pair of spaced flange sections, said reel being journaled for rotation between said flange sections and said snubber member has a pair of bent tabs formed along opposite sides of said body section, said tabs being engaged in face-to-face relationship with said flange sections and defining the distance between said flange sections.

3. The invention as defined in claim 1, including yieldable means acting on said reel to bias said reel in a wind up direction so that the belt can be wound around said snubber member and said reel.

4. The invention as defined in claim 1, wherein said snubber member has a thickness substantially corresponding to the thickness of said belt.

5. The invention as defined in claim 1, wherein the longitudinal side edge of said first side section is parallel to said belt-receiving slot and said sockets are formed radially inwardly from the surface of said reel.

References Cited

UNITED STATES PATENTS

| | | | |
|---|---|---|---|
| 1,534,755 | 4/1925 | Abbott | 242—74 |
| 3,065,838 | 11/1962 | Biedinger et al. | 242—74 X |
| 3,301,503 | 1/1967 | Browning | 242—107 |
| 3,323,743 | 6/1967 | Landgraf | 242—74 X |
| 3,325,212 | 6/1967 | Dillender | 242—107.4 X |

WILLIAM S. BURDEN, *Primary Examiner.*

U.S. Cl. X.R.

242—74